United States Patent [19]

Borgman et al.

[11] Patent Number: 4,583,910
[45] Date of Patent: Apr. 22, 1986

[54] VACUUM APPARATUS FOR TRANSFERRING ROUND FOOD ARTICLES

[75] Inventors: Bradley N. Borgman, Riverside; Jerry W. Cramer, Upland; Don E. Dossey, Montclair, all of Calif.

[73] Assignee: Sunkist Growers, Inc., Sherman Oaks, Calif.

[21] Appl. No.: 570,265

[22] Filed: Jan. 12, 1984

[51] Int. Cl.⁴ ............................................. B66F 11/00
[52] U.S. Cl. ...................................... 414/752; 901/40
[58] Field of Search ............... 414/737, 744 B, 752, 414/736; 901/40

[56] References Cited

U.S. PATENT DOCUMENTS 3,974,919  8/1976  Bukalders et al.
4,065,001 12/1977  Ohnaka .................. 901/40

FOREIGN PATENT DOCUMENTS 670888  9/1963  Canada .................. 414/737
171529  7/1965  U.S.S.R. ................ 414/752

Primary Examiner—William E. Wayner
Attorney, Agent, or Firm—Paul A. Weilein

[57] ABSTRACT

Apparatus for picking up and transferring layers of round food articles and the like is disclosed including movable pickup heads mounted on a carriage, each pickup head comprising a vacuum manifold or plenum forming multiple openings on a lower surface and adapted for developing low vacuum, high flow rate conditions variant, a vacuum cup mounted in each of the openings and having a bellows-like construction for permitting expansion and contraction along its axis, a flexible base portion of the vacuum cup forming a seal surface for engagement with one of the round food articles, the vacuum cup also forming a relatively large orifice for permitting relatively unrestricted communication between the vacuum cup and the plenum upon engagement of the vacuum cup with a food article in order to very rapidly produce a vacuum within the cup for causing adherence of the food article. The vacuum cup is also particularly adapted for assuring that the food article is retained upon the vacuum cup until released. A quick connect-disconnect latch assembly is also provided for facilitating replacement of the pickup heads on the carriage. A switching arrangement is also provided which functions automatically upon bottoming out of the pickup heads for initiating or terminating operation of a vacuum source in order to cause the vacuum cups to either engage or release the food articles.

21 Claims, 13 Drawing Figures

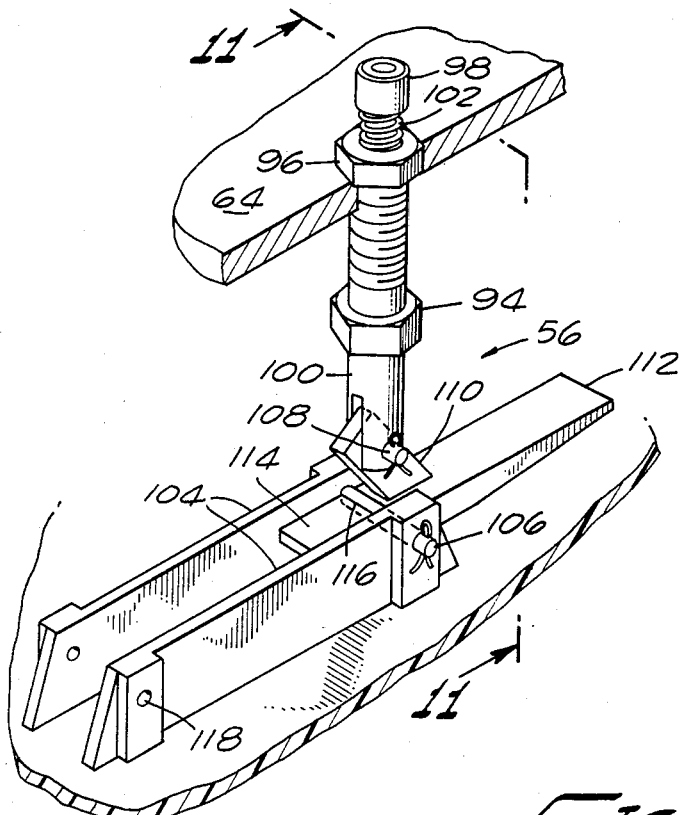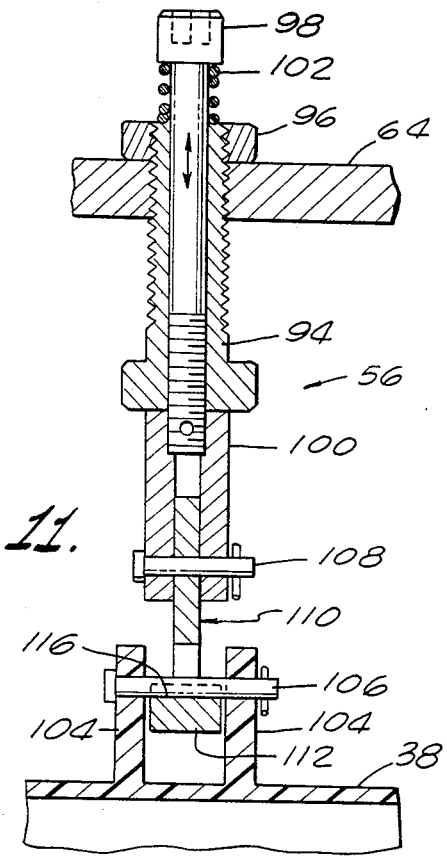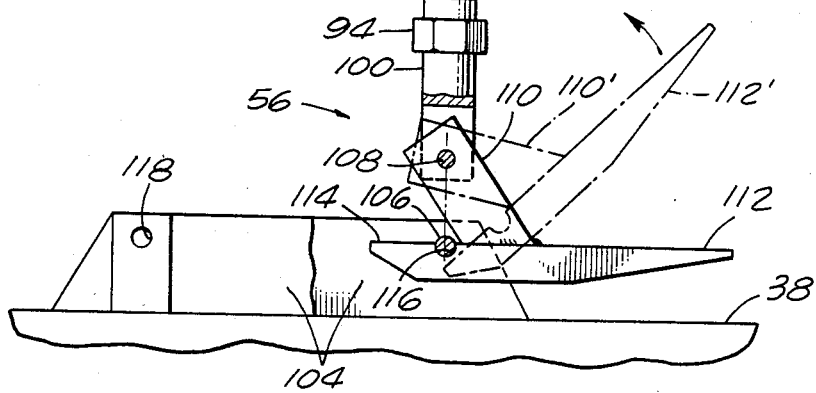

VACUUM APPARATUS FOR TRANSFERRING ROUND FOOD ARTICLES

BACKGROUND OF THE INVENTION

The present invention relates to apparatus for picking up and transferring layers of round articles and more particularly to apparatus adapted for picking up and transferring layers of round food articles or the like which are subject to surface irregularities.

Generally, the prior art has provided a large variety of transfer apparatus of the type referred to above. Such apparatus is commonly employed for handling round food articles such as fruit, particularly citrus fruit, which is subject to surface irregularities. For example, it is well known that the surfaces of the oranges are heavily textured. The oranges also include navels and may be formed with creases, both of which provide surface irregularities which may interfere with the operation of vacuum type devices for picking up and transferring the oranges.

Apparatus of the type contemplated by the present invention generally provides for the placement of fruit or other round food articles on conveyors or other means adapted to form units of fruit into layers or arrangements particularly adapted for nesting multiple layers of the fruit in packing boxes or the like. It is desirable that the units of fruit be of generally the same size and that they nest or interfit with one another in multiple layers within the case to facilitate transport of the packed fruit and also to provide a more pleasing appearance. In order to best achieve such a nested or interfitted arrangement of fruit, such machines are often adapted for placing alternating layers of different arrangements within the packing carton.

Accordingly, apparatus for picking up and transferring layers of fruit and similar articles are commonly formed with separate supply stations forming different groups of fruit, pickup heads being operated for alternately transferring these layers of fruit into a packing carton or other receptacle in order to achieve maximum nesting as referred to above.

It is also well known that mechanical handling is preferably to be minimized in order to reduce injury to the food articles. Accordingly, the use of vacuum devices for picking up and transferring such food articles has also become common. For example, vacuum transfer devices of the type generally contemplated by the present invention may be seen in U.S. Pat. No. 4,453,802 issued July 8, 1969 to F. W. Riddington and U.S. Pat. No. 3,590,551 issued July 6, 1971 to Riddington, et al., both of these patents being assigned to the assignee of the present invention. Particular attention is directed to U.S. Pat. No. 3,928,942 issued Dec. 30, 1975 to Paddock et al, also under assignment to the assignee of the present invention, since it disclosed a packing station similar to that providing a setting for the present invention. However, each of these patents is believed useful for providing a better understanding of the present invention.

It will be noted from a review of the above patents that each of them includes pickup heads with multiple vacuum cups for engaging an array or layer of round food articles and transferring them, preferably for arrangement in a packing box or the like. However, it is also to be understood that other devices have also been disclosed in the prior art which teach the use of similar vacuum apparatus for picking up and transferring generally round food products. It will of course be immediately apparent that such apparatus could also be used for other generally round fruit and vegetable products which is similarly packed in cases or boxes.

Attention is also directed toward U.S. Pat. No. 3,169,354 issued Feb. 16, 1965 to Bliss, et al, which discloses the use of similar vacuum devices for picking up and transferring eggs. The Bliss apparatus differs from the other patents referred to above in that eggs are naturally not nested or interfitted in a manner described above for citrus fruit, largely because of the very fragile nature of the eggs. However, reference to this patent makes it obvious that vacuum transfer apparatus of the type contemplated by the present invention may be useful for a variety of objects.

Generally, such vacuum type apparatus for picking up and transferring round articles such as citrus fruit have been found to perform very satisfactorily, particularly in packing stations. However, long operating experience with such devices has uncovered a number of areas where improvement appears possible. For example, as noted above, it is necessary that a complete array or layer of fruit or other objects be engaged by each pickup head and transferred properly into a carton or other container. If one or more articles of fruit is found to be missing from such a layer, it is necessary to complete the layer, usually by manually inserting additional pieces of fruit or other objects into the layer for engagement by the vacuum device. This involves stopping of the machine and results in reduced operating efficiency.

It is, of course, desirable to minimize any instances of lost fruit from the layers. However, other related problems have been found to develop in this regard. For example, where a common vacuum source is employed for engaging an array of fruit on a pickup head, the absence of one or more units of fruit in the array tends to interfere with proper development of the vacuum conditions for engagement of the other pieces of fruit. At the same time, if one or more units of fruit are missing from a layer, this is most commonly detected by different vacuum conditions in the system. It is, of course, desirable that a signal be generated as early as possible to indicate any units missing from the array so that a minimum of time is lost in completing each layer.

Other areas of improvement have also been found to exist. For example, with vacuum apparatus being employed for picking up and transferring relatively heavy objects such as citrus fruit, swinging movement of the units of fruit on the pickup heads may often interfere with proper operation of the apparatus and may even result in loss of the fruit during transfer toward a packing carton. Accordingly, it is also desirable to minimize the loss of food articles or fruit from the apparatus during transfer.

It has also been found that there is often a need for replacement or interchange of the pickup heads on the apparatus, for example, either to replace individual vacuum cups or to change the pattern of fruit in the various layers. Accordingly, there has also been found to remain a need for devices permitting more rapid replacement of the pickup heads.

When citrus fruit is being picked up and transferred, wax from the fruit tends to build up on the flexible vacuum cups, often interfering with subsequent operation. Furthermore, it is obvious that there is a need for further minimizing injury or discoloration of the fruit in order to reduce spoilage and to maintain as pleasing an appearance as possible. In addition to possible injury resulting to the fruit from engagement with the transfer device, the packing cartons or other surfaces, it has also been found that the mere use of vacuum apparatus engaging the surface of the fruit may produce a sufficient pressure differential through the skin of the fruit to result in ruptured or broken oil sacs. This condition may result in discoloration of the fruit or even increased spoilage over substantial periods of time. Accordingly, there has also been found to remain a need for improved apparatus for picking up and transferring such articles, not only to facilitate the transferring and packing of the articles but also to minimize damage to the articles themselves.

SUMMARY OF THE INVENTION

It is therefore an object of the invention to provide improved apparatus for picking up and transferring layers of round food articles and the like while achieving improved performance in one or more of the areas referred to above. In particular, it is an object of the invention to provide such apparatus for picking up and transferring layers of round food articles such as citrus fruit and the like which tend to be subject to surface irregularities.

It is also an object of the invention to provide such improved apparatus of a type including movable heads for picking up and transferring layers of such round articles, the pickup heads for the apparatus comprising a manifold or plenum forming multiple openings on a lower surface while being adapted for developing relatively low vacuum, high flow rate conditions adjacent the openings, each of the openings being fitted with a vacuum cup adapted for responding to the low vacuum, high flow rate conditions upon engagement with a round food article for dynamically sealing a food article to the vacuum cup. The manner in which the manifold or plenum functions in this regard is described in greater detail below. However, in a preferred embodiment of the invention adapted for picking up and transferring layers of citrus fruit such as oranges, it has been found that use of a vacuum source capable of developing a relatively low vacuum of no more than 10 inches of mercury, preferably about five inches of mercury (12.5 centimeters), and a relatively high flow rate of 60-100 cubic feet per minute, preferably about 80 cubic feet per minute (about 45 liters per second), results in a number of unique advantages in vacuum operated pickup and transfer apparatus. Initially, the relatively low vacuum assures minimum injury or discoloration in the fruit during pickup and transfer. At the same time, as will be discussed in greater detail below, the combination of low vacuum and high flow rate conditions within the plenum greatly improves the efficiency of the pickup heads both in the initial development of vacuum conditions for causing the food articles to adhere and in better assuring that the food articles remain in place upon the pickup heads during transferral into packing boxes or other containers.

It is yet another object of the invention to provide an improved vacuum cup for use with pickup heads of the type referred to above. The vacuum cup of the present invention includes a number of features which permit improved performance of the pickup heads. In particular, these features include formation of the vacuum cup with means facilitating rapid interchange on a manifold or plenum. This feature is preferably achieved by engagement means in the form of an enlarged nipple on the vacuum cup which may be rapidly fitted into or removed from an opening on the plenum. The vacuum cup is also formed with an annular segment adjacent the attachment means of increased cross-section relative to the remainder of the vacuum cup. Preferably, with the vacuum cup being in a relaxed or extended condition, this annular section tapers away from the manifold so that the vacuum cup is capable of moving angularly for better initial engagement with round food articles or the like. However, upon subsequent development of a vacuum within the plenum and the vacuum cups, each vacuum cup is retracted and the annular section of increased cross-section is urged into engagement with the manifold. This feature thus tends to resist angular movement of the vacuum cup and swinging motion of the fruit or other article suspended from the cup.

The vacuum cup is preferably formed with a seal surface at its lower open end which is sized and preferably formed as a section of a sphere to better mate with the surface of the fruit. A flexible band of increased cross-section is also preferably formed at the open end of the seal surface in order to better facilitate formation of a seal between the seal surface and the fruit.

Numerous other novel features are disclosed below which further enable the vacuum cup to better engage and secure the units of fruit or other round objects in place upon the pickup heads of the pickup and transfer apparatus.

It is yet another object of the invention to provide such apparatus having one or more pickup heads with a quick connect-disconnect coupling for securing each pickup head in place. Preferably, this coupling comprises bracket means for assuring proper alignment of the pickup head on the movable carriage.

It is a similar object of the invention to provide an improved switch assembly which functions automatically upon bottoming out of the pickup head for initiating or terminating vacuum conditions in the pickup heads to respectively secure a layer of articles upon the head or to release the layer of articles in a packing box or the like.

Additional objects and advantages of the invention are made apparent in the following description having reference to the accompanying drawings.

BRIEF DESCRIPTION OF THE DRAWINGS

In the drawings which are to be regarded as merely illustrative:

FIG. 10 is a fragmentary perspective view, with parts in section, of a latch assembly forming a portion of the pickup head of FIGS. 2-4.

FIG. 11 is a view taken along section line 11—11 of FIG. 10 to better illustrate construction of the latch assembly.

FIG. 12 is an elevational view taken from the right side of FIG. 11 to better illustrate the mode of operation for the latch assembly.

DESCRIPTION OF THE PREFERRED EMBODIMENT

Figure 1:
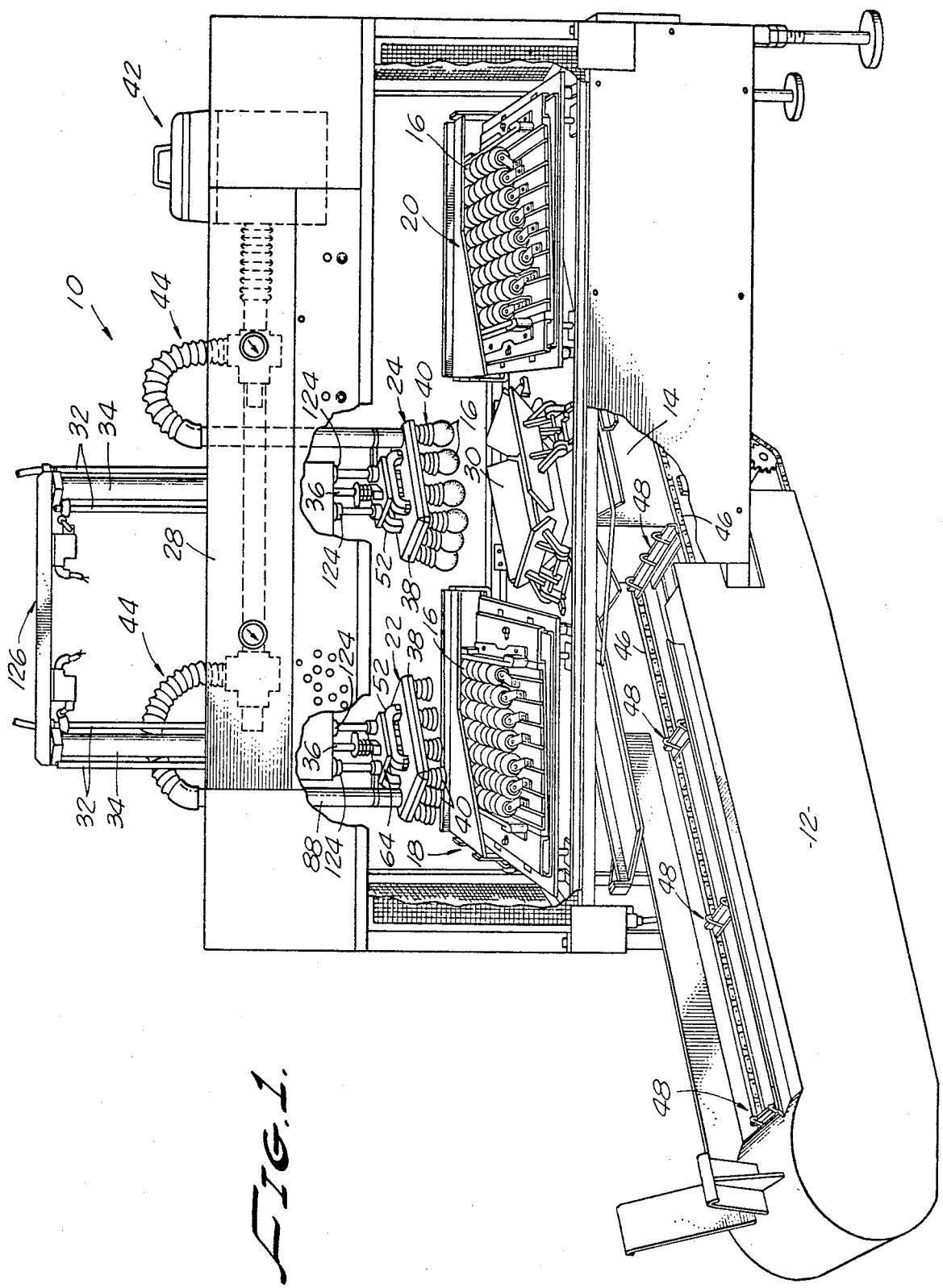
FIG. 1 is an elevational view of automatic packing apparatus incorporating the presently preferred embodiment of the invention, portions of the apparatus being broken away to better show concealed parts.

Vacuum apparatus for picking up and transferring round food articles such as citrus fruit and the like is illustrated in the drawings, particularly within a packing station of the type generally represented in FIG. 1. Referring to FIG. 1, the packing station 10 includes a conveyor 12 for sequentially moving boxes such as that indicated at 14 into position at the packing station. With the box 14 positioned as illustrated in FIG. 1, fruit 16, preferably oranges or other citrus fruit, is packed into the box 14 in alternate layers that are of complementary patterns enabling them to nest together.

As noted above, this nested arrangement is desirable both for assuring that the fruit remains firmly packed within the box and also to provide a pleasing appearance. In any event, the alternate layers or patterns are formed in two separate supply stations comprising a left supply station 18 and a right supply station 20. The left station forms the fruit into what is termed the left pattern and the right station forms the fruit into what is termed the right pattern. For purposes of the present invention, it is only necessary to understand that the patterns in the two supply stations are suitably complementary for properly packing the box 14.

In order to alternately pack the two patterns of fruit into the box 14, the packing station apparatus provides a left pickup head 22 adapted for picking up layers of fruit at the left supply station 18 with a left pattern and a right pickup head 24 adapted to pick up layers of fruit at the right supply station 20 with a right pattern. The two pickup heads extend downwardly from a carriage 26 which is largely concealed behind a panel 28. The carriage is automatically reciprocated between a left position shown in FIG. 1 and a right position as described below. In the left position as shown in FIG. 1, the left pickup head 22 is positioned over the left supply station 18 for suitably picking up a layer of oranges while the right pickup head 24 is positioned over the centrally arranged box 14 in the packing station. In the alternate or right position, the carriage is shifted rightwardly so that the right pickup head 24 is over the right supply station 20 again in a position suitable for picking up a layer of oranges while the left pickup head 22 is positioned over the centrally arranged box.

When the carriage is in the left position shown in FIG. 1, the left pickup head 22 descends to pick up a layer of fruit from the left supply station 16 while the right pickup head 24 simultaneously descends through a chute or guide 30 for depositing a layer of fruit in the box 14. After the layer of fruit is engaged by the left pickup head and the right pattern layer of fruit is deposited in the box by the right pickup head 24, both pickup heads are again raised and moved to a right position by the carriage. In the right position, the right pickup head 24 is lowered to pick up a layer of fruit at the right supply station 20 while the left pickup head 22 is simultaneously lowered through the chute 30 for depositing a left pattern layer of fruit in the box 14. The carriage and pickup units continue in this reciprocal manner of operation until the box 14 is completely filled with fruit.

Each of the pickup heads is mounted on a corresponding pair of guide rods 32 which extend through guide sleeves (not shown) on the carriage 26. The pickup heads are reciprocated vertically by corresponding air cylinders 34 which are operated in unison by suitable controls (not shown).

Construction of each of the pickup heads 22 and 24 in accordance with the present invention is described in greater detail below having particular reference to FIGS. 2-12. However, as may be seen in the packing station 10 of FIG. 1, each pickup head is connected to the lower ends of the corresponding guide rods 32 and also to a piston rod 36 extending downwardly from the corresponding air cylinder 34.

Continuing with reference to FIG. 1, each pickup head includes a vacuum manifold or plenum 38 which carries on its underside an array of vacuum cups 40 generally arranged in a pattern corresponding either to the right or left pattern of fruit as described above in connection with the supply stations 18 and 20.

In addition to controls which automatically raise and lower the pickup heads 22 and 24 upon the carriage 26 and also laterally reciprocate the carriage 26 between the left and right positions decribed above, the packing station 10 also includes a vacuum source 42 which is in communication with the two pickup heads through a flexible branched conduit 44.

The conveyor 12 includes spaced parallel conveyor chains 46 which are interconnected by flights 48 for transferring successive boxes to the packing station. As each box 14 arrives generally at the center of the packing station beneath the chute 30, suitable controls (not shown) operate to stop the conveyor. Subsequently, after each box 14 is filled by the pickup heads 22 and 24, the conveyor is again operated to shift the filled box 14 out from the central packing station position and to replace it with another box (not shown).

The general arrangement of the packing station and the components described above are for the most part identical with apparatus disclosed in above-mentioned Paddock et al. U.S. Pat. No. 3,982,942. Accordingly, that reference is incorporated herein in order to afford a complete description of various components within the packing station. However, it is to be understood that certain components of the packing station, particularly the pickup heads 22, 24, the manner in which the pickup heads are mounted on the carriage, the operating characteristics of the vacuum source 42 and other features described below form part of the present invention and are better illustrated in FIGS. 2-12.

As noted above, construction of the two pickup heads 22 and 24 is identical except for the arrangement of the vacuum cups 40 to conform to either the left or right pattern of fruit on the left and right sides of the packing station 10 (see FIG. 1). Accordingly, only the left pickup head 22 is described in greater detail below, it being understood that the right pickup head 24 is of similar construction except for the arrangement of the vacuum cups and possibly other minor features which are not necessary for an understanding of the invention.

Figure 2:
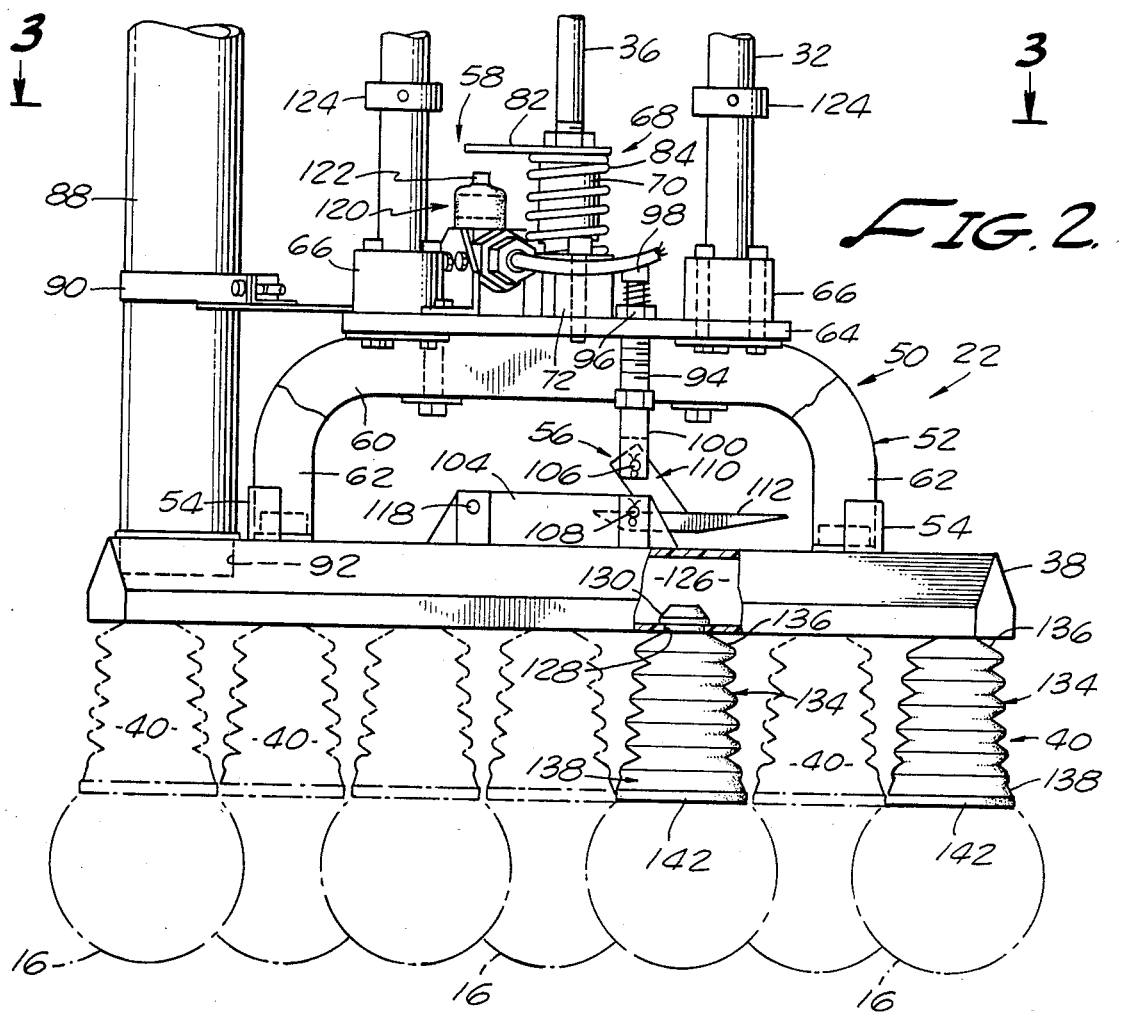
FIG. 2 is an enlarged fragmentary view in elevation of one of a plurality of pickup heads on the packing apparatus of FIG. 1.
Figure 3:
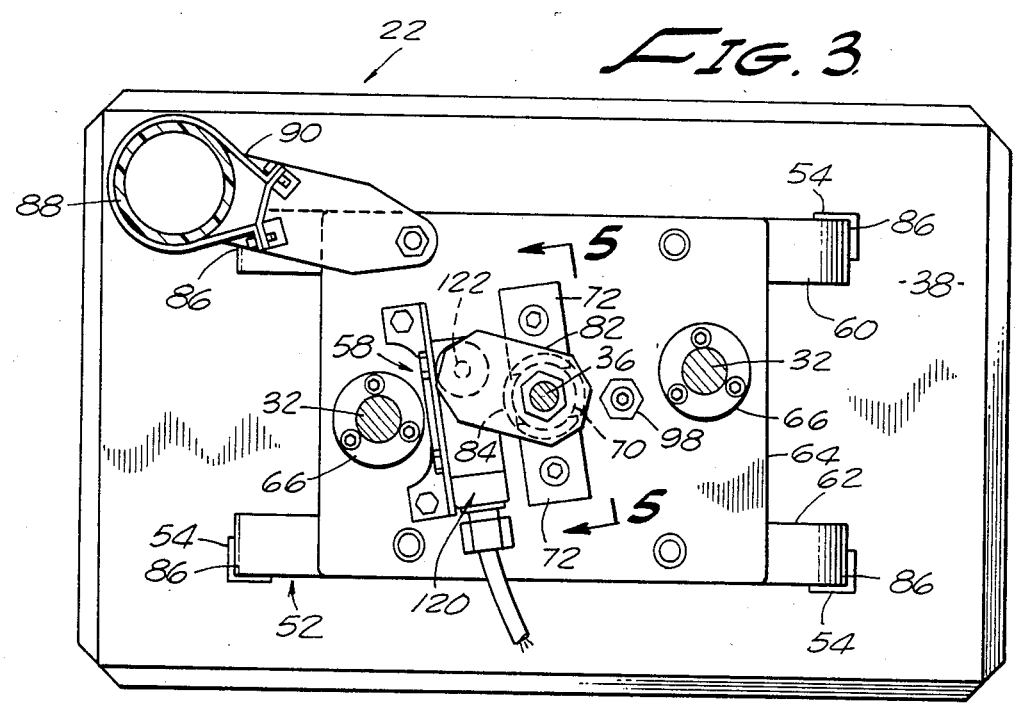
FIG. 3 is a plan view of the pickup head taken along section line 3—3 of FIG. 2.
Figure 4:
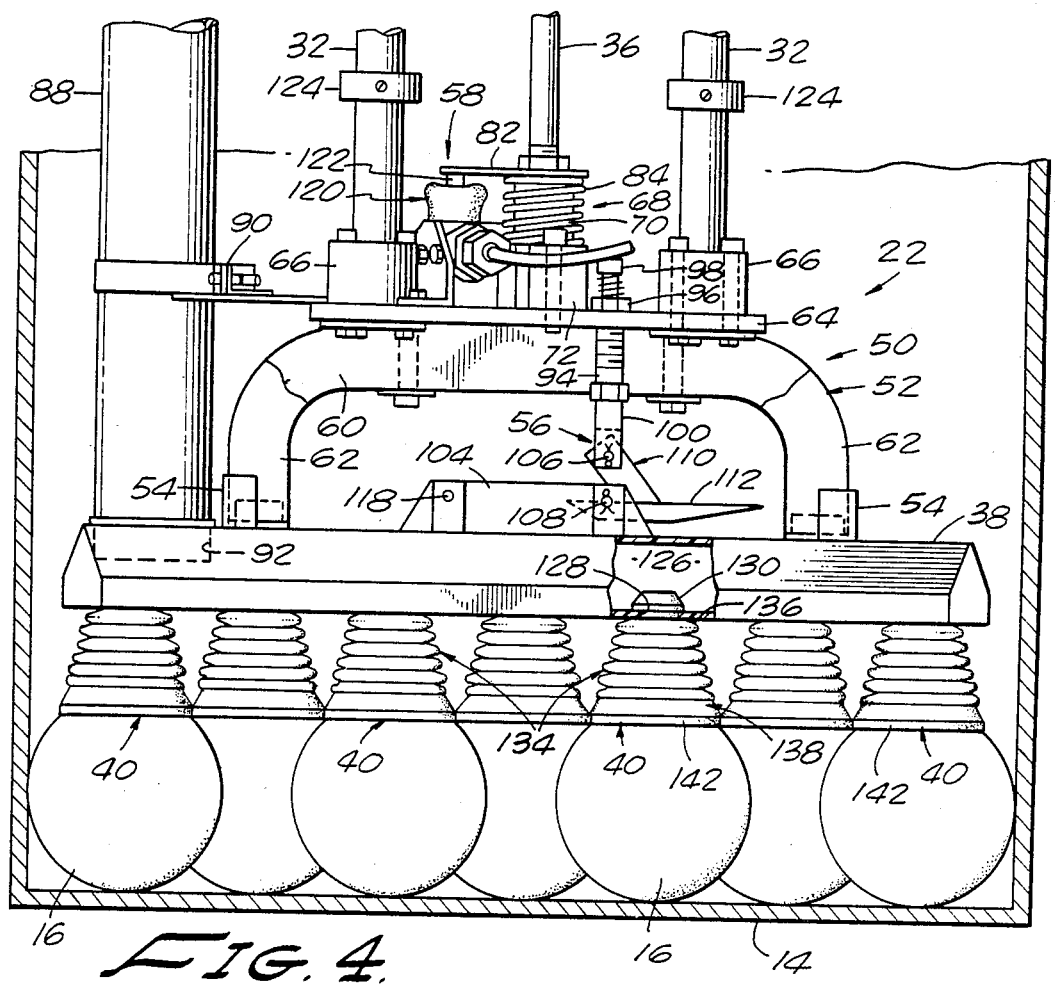
FIG. 4 is a similar view of the pickup head as in FIG. 2 but with the pickup head transferred and lowered into a packing carton so that the articles of fruit on the pickup head are in engagement with the bottom of the packing carton and the pickup head is in a "bottomed out" condition.

Referring particularly to FIGS. 2-4, the left pickup head 22 is illustrated in greater detail to emphasize various features of the invention. Initially, the pickup head is adapted for rapid connection and disconnection on the carriage 26 as represented by the guide rods 32 and piston rod 36. The quick connect-disconnect coupling is generally indicated at 50 and includes a fabricated mounting bridge 52 which is adapted for precise alignment with the manifold 38 by means of a plurality of brackets indicated collectively at 54. The coupling 50 also includes a latch assembly 56 which is operable for connecting or releasing the pickup head on the mounting bridge 52.

A switch assembly 58 is also arranged on the mounting bridge 52 for sequentially initiating and terminating operation of the vacuum source 42 in a manner described below. The construction and operation of the vacuum cups 40 together with the manifold 38 and the vacuum source 42 are also important features of the present invention. Accordingly, the coupling 50, the switch assembly 58 and the construction and operation of the vacuum cups 40, the manifold 38 and the vacuum source 42 are described in greater detail.

Initially, as noted above, it may often be necessary to replace the pickup head 22 upon the carriage 26 either for purposes of replacing components or for changing the pattern of fruit to be picked up and transferred by the pickup head. Rapid replacement is of course necessary for efficient operation of the packing station. In any event, the coupling 50 is adapted to permit rapid connection and disconnection between the pickup head 22 and the mounting bridge 52. The bridge 52 is formed by two tubular uprights which are bolted to a platform 64. The platform 64 is in turn secured to the guide rods 32 by respective bosses 66. The platform 64 is secured to the piston rod 36 by a resilient coupling 68 which is illustrated in greater detail in FIGS. 5 and 6.

Figure 5:
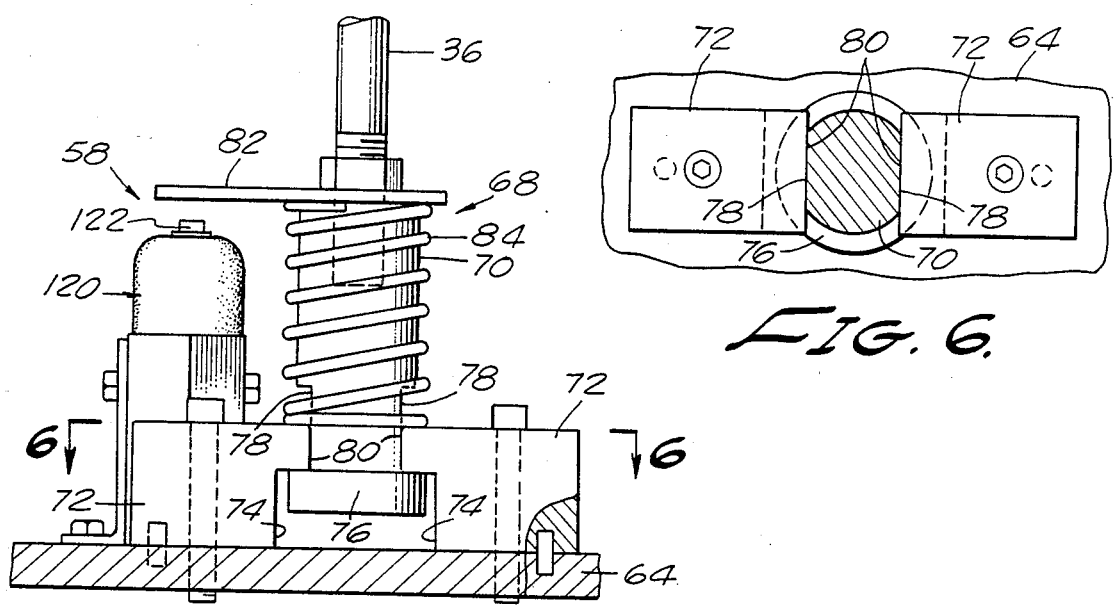
FIG. 5 is an enlarged fragmentary view of a switch assembly on the pickup head illustrated in FIGS. 2-4.
Figure 6:
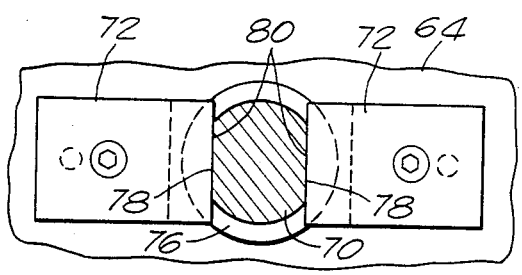
FIG. 6 is a view taken along section 6—6 of FIG. 5.

Referring also to FIGS. 5 and 6, the resilient coupling 68 is formed with a cylindrical extension 70 which is threaded onto the lower end of the piston rod 36. Brackets 72 forming a recessed opening 74 are secured to the platform 64 in alignment with the extension 70. The lower end of the extension 70 forms an enlarged head 76 which is captured within the recess 74. A portion of the extension 70 just above the head 76 is formed with flats 78 which mate with flats 80 in the recess opening to prevent rotation of the pickup head relative to the piston rod 36.

An actuating element 82 is secured to the piston rod 36 adjacent the extension 70 while a compression spring 84 is arranged for interaction between the actuating element 82 and the brackets 72. The actuating element 82 forms a portion of the switch assembly 58 described further below. In any event, it may be seen that the compression spring 84 tends to maintain the platform 64 of the pickup head 22 in the downward position shown in FIG. 5 relative to the piston rod 36. However, when relative upward force is exerted on the pickup head, the arrangement of the extension head 76 within the recess 74 permits the pickup head to move upwardly until the head 76 abuts the platform 64. This relative travel of the pickup head is important in operation of the switch assembly 58 as will also be described below.

Returning again to the coupling 50, the tubular uprights 60 and 62 form four corners collectively indicated at 86. Similarly, the four brackets 54 are precisely positioned upon the manifold or plenum 38 so that they fit into relatively close tolerance engagement with the corners 86 in order to precisely position the pickup head 22 upon the mounting bridge 52.

At the same time, a tube 88 connected with the branch conduit 44 is secured to the platform 64 of the mounting bridge 52 by a coupling 90. When the manifold 38 is properly positioned upon the mounting bridge, the lower end of the vacuum tube 88 fits into an opening 92 in the manifold in relatively sealed relation so that the interior of the manifold 38 is in communication with the vacuum source 42.

With the manifold 38 of the pickup head 22 so positioned relative to the mounting bridge 52, it is locked in place by means of the latch assembly 56. The latch assembly 56 is illustrated in greater detail in FIGS. 10-12. Referring also to those figures, the latch assembly includes a hollow threaded bolt 94 which is threaded into the platform 64 and positioned by means of a jamb nut 96. Another bolt 98 passes downwardly through the hollow bolt 94 for attachment to a cylindrical yoke 100. Another compression spring 102 is arranged between the head of the bolt 98 and the jamb nut 96 in order to urge the bolt 98 and cylindrical yoke upwardly toward the position illustrated in FIG. 11.

Spaced parallel brackets 104 are formed on the upper surface of the manifold 38 generally in alignment with the yoke 100, pins 106 and 108 being mounted respectively in the brackets 104 and the yoke 100.

A lever member 110 is coupled with the yoke 100 by the pin 108. A ramp element 112 is integrally formed with the lever member 110 and forms an upwardly facing ramp surface 114 for interaction with the pin 106. A slot 116 is formed in the ramp member 112 along the surface 114 so that the ramp surface 114 can be weighed beneath the pin 106 until the pin 106 drops into the slot 116.

This arrangement permits operation of the latch assembly 56 in a manner which may be best seen in FIG. 12. Initially, the yoke 100 and other portions of the latch assembly secured to the platform 64 may be adjusted by means of the bolt 94 and jamb nut 96. With the manifold 38 of the pickup head positioned as shown in the drawings, the lever and ramp members 110 and 112 are then rotated in clockwise fashion as viewed in FIG. 12 so that the ramp surface 114 passes beneath the pin 106 and the pin 106 enters into engagement with the slot 116 as illustrated in each of FIGS. 10 and 11. The spring 102 allows relative movement in the switch assembly for permitting the latch assembly to be connected with or disconnected from the platform 64 and the manifold 38. Conversely, the latch assembly is operated in counterclockwise fashion, referring again to FIG. 12, in order to release the pin 106 from the slot 116.

It may also be seen particularly in FIGS. 10 and 12 that the bifurcated bracket 104 is elongated and forms an alternate location 118 for the pin 106 at the opposite end of the bracket 104. This feature permits the pickup heads 22 and 24 to be interchanged upon the right and left sides respectively of the carriage 26.

Referring momentarily to FIG. 1, it is again noted that the two pickup heads 22 and 24 are first moved into the left position and then simultaneously lowered to permit the vacuum cups 40 on the left pickup head 22 to engage a layer of oranges 16 on the left supply station 18 while the oranges 16 secured to the right pickup head 24 are lowered into the bottom of the box 14 and then released. Thereafter, both pickup heads are raised, shifted to a right position and lowered so that oranges carried by the left pickup head 22 are positioned in the box 14 while the right pickup head 24 picks up another layer of oranges from the right supply station 20. The packing station 10 continues to operate in this reciprocating fashion until the box 14 is completely filled.

The switch assembly 58 forming a portion of each of the pickup heads serves to sequentially initiate and terminate operation of the vacuum source 42 for each separate pickup head for the purpose of engaging the oranges with the vacuum cups in the supply stations and for releasing the oranges from the vacuum cups when they are properly positioned within the box 14.

For this purpose, referring particularly to FIGS. 2-5, a switch assembly 120 adapted for separately operating the vacuum source for the respective pickup head is mounted on the platform 64 with its switch element 122 in operating alignment with the actuating element 82.

With the switch assembly 58 so arranged, the switch element 122 is operated by the actuating element 82 each time that the pickup head 22 enters into a bottomed out condition either at the supply station 18 or in the box 14. As the pickup head 22 is lowered in either location, the vacuum cups 40 and manifold 38 are urged upwardly against the compression spring 84, the switch assembly 120 being carried upwardly by the platform 64 until its switch element 122 is engaged by the actuating element 82.

When such a bottoming out condition arises with the pickup head in the supply station location, the vacuum source is actuated for that particular pickup head in order to develop a vacuum within the manifold 38 and suction cups as described in greater detail below. When the pickup head is lowered into the box 14, it reaches a similar bottomed out condition where the switch element 122 is again contacted by the actuating element 82 in order to terminate operation of the vacuum source for that particular pickup head.

It is to be noted that a similar switch assembly on the right pickup head 24 operates simultaneously but in opposition to the switch on the left pickup head 22. Thus, when a vacuum is initiated within the left pickup head for engaging a layer of oranges at the left supply station 18, the vacuum is interrupted in the right pickup head for releasing a layer of oranges within the box 14. This step of course occurs with the carriage in the left position illustrated in FIG. 1. When the carriage is in the right position and is lowered into a bottomed out condition, the vacuum in the left pickup head 22 is terminated to release a layer of oranges into the box 14 while a vacuum is again developed in the right pickup head for engaging a layer of oranges on the right supply station 20.

During operation, the pickup heads tend to be raised and lowered relatively rapidly for efficient operation of the packing station. Because of the substantial weight of the oranges, their inertia may tend to move the manifold 38 upwardly somewhat even after upward movement of the pickup head is terminated. If the inertial effect of the oranges were sufficient to carry the pickup head upwardly to a point where the switch assembly 120 is actuated by the element 82, the oranges could be prematurely released. In order to prevent this from happening, collars 124 are adjustably secured to the guide rods 32 at a location where they engage a fixed portion of the carriage 26 sufficient to prevent such premature switch actuation.

As noted above, the construction and operation of the vacuum cups 40, preferably in combination with the manifold or plenum 38 and the vacuum source 42 are selected to further enhance operating efficiency of the packing station as noted above. Initially, the manifold 38 is formed with a hollow interior 126 and openings such as those indicated at 128 for each of the vacuum cups 40. Thus, the vacuum source is in communication through the tube 88 with the interior 126 of the manifold 38 and with each vacuum cup arranged in one of the openings 128.

The vacuum source 42 is particularly selected for developing low vacuum, high flow rate conditions within the manifold 38 adjacent the openings 128. Preferably, the vacuum source 42 includes a bladed fan or blower type pump (not otherwise shown) for developing such characteristics within the manifold. Preferably, the vacuum source is selected for developing low vacuum conditions of about 5 inches (12.5 cm) of mercury while being capable of developing high volume flow, for example, about 60-100 cubic feet per minute (or about 34-56 liters per second). This flow rate is generally based upon unrestricted flow through the vacuum source. With the arrangement of the manifold and the openings into the vacuum cups, the actual flow rate would, of course, be reduced. However, it is noted that the low vacuum condition of about 5 inches of mercury is preferable in order to clearly avoid possible rupture in the skins of citrus fruit. However, it is more generally necessary to develop a vacuum of no more than about 10 inches of mercury. Higher vacuum conditions have been found to cause rupture as noted above.

At the same time, the high volume flow rate which is preferably about 80 cubic feet per minute (about 45 liters per second) is sufficient to assure the development of sufficient vacuum conditions within the manifold and within the vacuum cups even if one or more oranges are absent from the vacuum cups. These conditions are of particular importance in combination with the novel vacuum cup described below for achieving optimum performance in the packing station.

Figure 7:
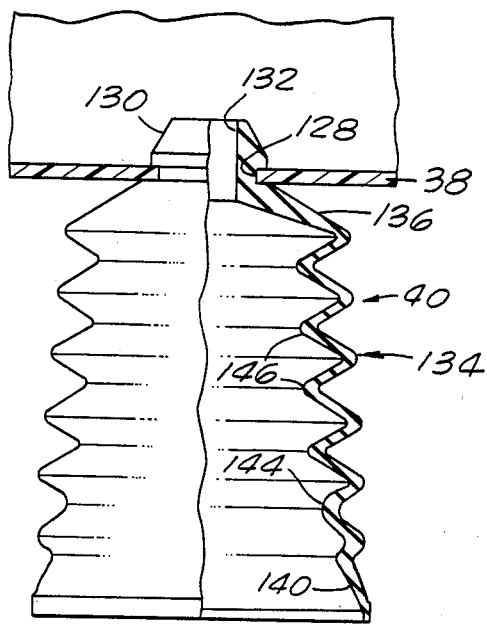
FIG. 7 is a further enlarged fragmentary view of a portion of a manifold or plenum in the pickup head of FIGS. 2 and 4 while also illustrating one of a plurality of vacuum cups employed with the plenum, part of the vacuum cup being broken away to better illustrate its internal construction.
Figure 7A:
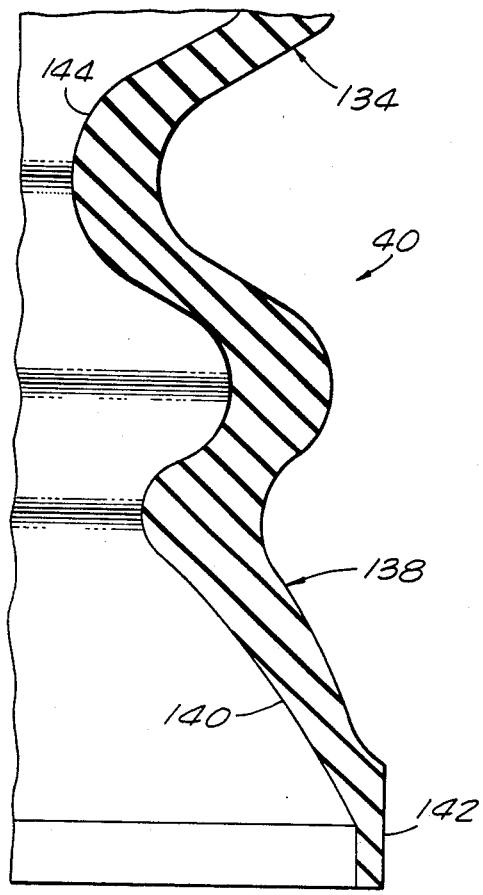
FIG. 7a is a greatly enlarged fragmentary view of a cross-sectional portion of the vacuum cup shown in FIG. 7.
Figure 8:
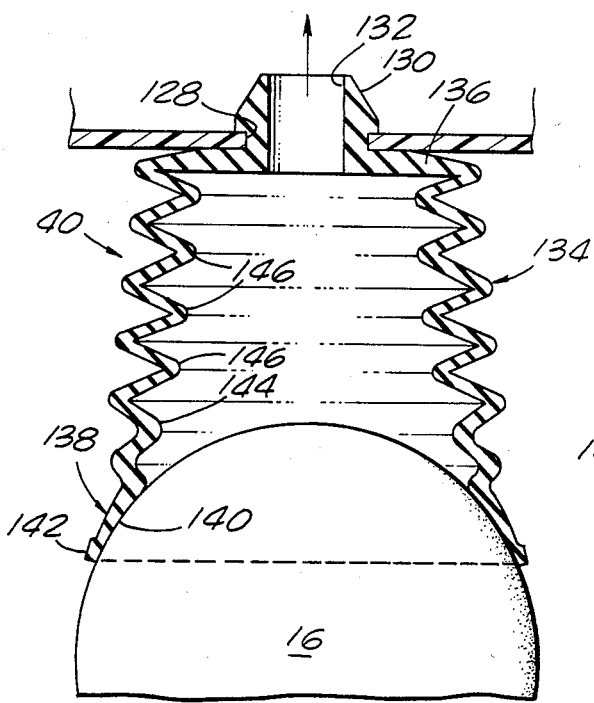
FIG. 8 is a view generally similar to FIG. 7 with a round food article positioned beneath the vacuum cup.
Figure 9:
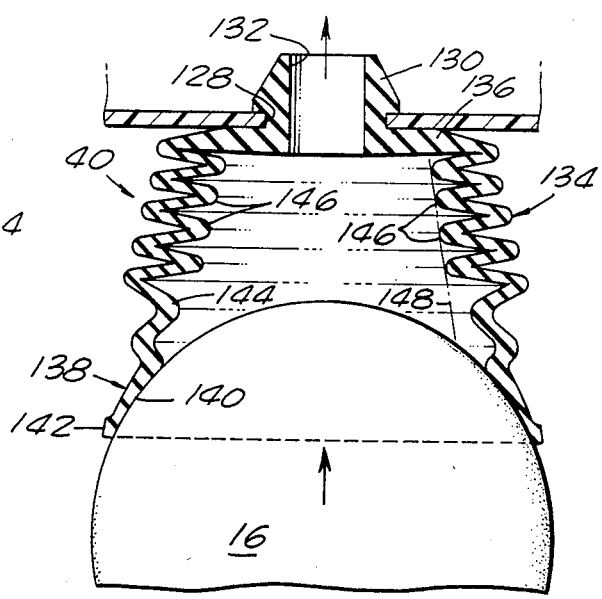
FIG. 9 is yet another view similar to FIG. 7 with the vacuum cup being further compressed generally in a "bottomed out" condition as was also referred to above in connection with FIG. 4.

The construction and manner of operation for the vacuum cups 40 may be best seen by combined reference to FIGS. 2-4 and enlarged FIGS. 7-9.

Referring particularly to FIG. 7, each of the vacuum cups 40 is formed from flexible material and includes an enlarged flexible nipple 130 for snap-fit engagement into one of the openings 128. Teh nipple 130 of the vacuum cup also forms an orifice 132 which is sized to permit relatively unrestricted flow of air or gas from the vacuum cup interior into the manifold 38 in order to facilitate development of the low vacuum, high flow rate conditions described above. The vacuum cup 40 is shown approximately to scale in FIG. 7 with the orifice 132 preferably being about ⅜ inches (or 0.9 cm) in diameter.

Each vacuum cup 40 is formed with a bellows-like portion 134 interconnected with the nipple 130 by an annular section 136 of relatively increased cross section. A flexible base portion 138 at the bottom of the bellows-like portion 134 forms a seal surface 140 adapted to enter into sealing engagement with a portion of the orange as may be best seen in FIGS. 8 and 9. For this purpose, the flexible base portion 138 is formed so that the seal surface 140 has a radius generally equal to corresponding proportions of average size oranges which are to be picked up and transferred in the packing station. The flexible base portion 138 is also formed with the seal surface 140 being frustospherical or an annular portion of a sphere so that it better mates with the corresponding surface configuration of the orange (again see FIGS. 8 and 9).

In order to better assure proper sealing engagement between the seal surface 140 and the surface of the orange or other food or round articles, a band 142 of relatively increased cross section is formed along the bottom or open end of the seal surface 140 to perform a number of functions. Initially, the band 142 functions in the manner of a rubber band for better urging the seal surface into engagement with the surface of the orange. At the same time, the increased cross section of the band 142 tends to better resist tearing or rupture of the flexible base portion 138.

The vacuum cup 40 also includes a number of additional features for further enhancing its operation. Initially, it has been found important to assure that the orange only enters into engagement with the seal surface 140 and not with any other portion of the cup. In particular, it is important that the surface of the orange not come in contact with any interior portion of the vacuum cup above the seal surface 140 since this would tend to interrupt the vacuum condition developed between the surface of the orange and the seal surface. To avoid such contact, a first inner convolution 144 spaced upwardly from the seal surface 140 is proportionately enlarged so that it remains out of contact with the orange.

Referring particularly to FIGS. 8 and 9, it may be seen that the bellows-like portion of the vacuum cup is formed with a plurality of inner convolutions 146 which are of proportionally increasing diameter moving downwardly through the vacuum cup or toward the seal surface 140. This proportional increase in the diameters of the convolutions 146 is indicated by a line 148 in FIG. 9. The first convolution 144 above the seal surface 140 is even larger than the proportional increase indicated by the line 148. This configuration assures that the first convolution 144 remains out of engagement with the orange surface even when the vacuum cup is fully retracted into a position as illustrated in FIG. 9.

As was noted above, the annular section interconnecting the bellows-like portion 134 with the nipple 130 is sufficiently flexible so that when the vacuum cup is extended or relaxed in a condition as best seen in FIG. 7, the annular section 136 tapers downwardly and away from the manifold 38. Thus, when either of the pickup heads (see FIG. 1) is lowered toward one of the supply stations, the vacuum cup has relative freedom of movement for better alignment with the fruit to assure that fruit is properly engaged by each of the vacuum cups. However, once a unit of fruit is positioned in the vacuum cup and vacuum conditions are developed therein, the vacuum cup is retracted slightly beyond the position illustrated in FIG. 8. In that condition, the relatively thick annular section 136 is urged upwardly into engagement with the manifold in order to effectively increase rigidity of the vacuum cup for resisting oscillating movement of the orange. In this manner, the construction of the vacuum cup tends to prevent swinging motion of the orange as it is transferred by the pickup head to better prevent accidental loss of the fruit during transfer.

The vacuum cup 40 is preferably formed from a flexible material such as an elastomer or the like having a selected Shore hardness for performing various functions. Preferably, portions of each vacuum cup 40 are formed with different Shore hardnesses in order to better adapt the vacuum cup for performing different functions.

The bellows-like portion 134 of the vacuum cup is formed from a flexible material having a relatively higher Shore hardness of about 70 which will permit axial expansion and contraction of the bellows-like portion of the vacuum cup as indicated in FIGS. 7, 8 and 9 while preventing undesirable radial collapse of any portion of the vacuum cup.

The flexible base portion 138 is preferably formed from an elastomeric material having a relatively lower Shore hardness of about 40 for at least two different purposes. Initially, the softer material tends to better permit the seal surface 140 to enter into sealing engagement with the surface of the orange. Also, this portion of the vacuum cup contacts the surface of the orange and may tend to build up a deposit of wax from the orange. In the past, it has been found necessary to periodically remove this wax deposit in order to assure proper continued operation of the vacuum cups. With the softer material forming the flexible base portion of the vacuum cup, increased flexure is permitted in the vacuum cup, causing the wax build-up to flake off from the seal surface so that the seal surface remains better conditioned for sealing engagement with subsequent units of fruit.

The method of operation for the apparatus of the present invention is believed obvious from the preceding description. However, the method of operation is set forth below in order to assure a complete understanding of the invention. Initially, with the pickup heads and other components of the packing station being assembled in the manner described above, the carriage is set in lateral reciprocating operation between the left and right positions described above.

When the carriage is in the left position, the left pickup head is picking up a layer of oranges or other citrus fruit at the left supply station while the right pickup head is depositing a layer of oranges in the box 14. Thereafter, the pickup heads are both raised with a supply of oranges in the left pickup head. Because of operation of the switch assembly 58 in the left pickup head, vacuum conditions are developed within its manifold 38 in order to secure the oranges in place.

The carriage is then shifted to the right position with the pickup heads both being lowered. In the right position, the left pickup head is positioned within the box 14 for depositing another layer of oranges while the right pickup head is positioned to pick up another layer of oranges from the right supply station.

As the pickup heads are lowered either into engagement with oranges on one of the supply stations or with a layer of oranges into the box 14, the pickup heads enter into a bottomed out condition best illustrated in FIGS. 4 and 9. In such a condition, upward force is applied through the vacuum cups 40 and the manifold 38 so that the coupling 50 is urged upwardly against the spring 84. In this condition, the switch assembly 120 rises so that its switch element 122 is engaged by the actuated element 82. With the switch assemblies 120 for the left and right pickup heads being interconnected with the vacuum source 42, the vacuum source is alternately operable for developing a vacuum in either pickup head to pick up a layer of fruit on the appropriate supply station and for terminating vacuum conditions in that particular head when the layer of oranges is deposited within the box 14 as illustrated in FIG. 4.

As noted above, the collars 124 tend to avoid accidental operation of the switch assembly 120 and premature release of the oranges.

As either of the pickup heads is lowered onto the appropriate supply station, the vacuum cups are in a relaxed position as illustrated in FIG. 7. Thus, the vacuum cups are free to move relative to their longitudinal axes in order to better engage fruit on the supply station. As the vacuum cups engage the fruit, a bottomed out condition is again developed for the respective pickup head causing operation of the switch assembly 58 and development of vacuum conditions within the manifold 38 and vacuum cups 40. Because of the low vacuum, high flow rate conditions referred to above, vacuum engagement between the seal surface 140 and a respective unit of fruit is more quickly developed.

At the same time, the high flow rate conditions causes increased flow of air away from any surface irregularity such as creases, navels or the like to better assure retention of the oranges in place. In the event that one or more oranges should be missing from any of the vacuum cups, the high flow rate also permits more rapid detection so that additional oranges could be placed in any of the vacuum cups to fill out the layer.

The high flow rate conditions also permit the pickup head to function even with a number of oranges missing from the vacuum cups. This is a particular advantage over the prior art where low flow rate, high vacuum conditions were developed since a layer of fruit could not be picked up if more than three or four oranges were missing from the layer. In addition, it is also noted again that the use of low vacuum tends to prevent surface rupture of the fruit.

Accordingly, novel apparatus has been disclosed above for picking up and transferring layers of round oranges such as food or the like. Various modifications and variations in addition to those described above are believed obvious. Accordingly, the scope of the invention is defined only by the following appended claims.

What is claimed is:

1. In apparatus including movable pick-up heads for picking up and transferring layers of round food articles subject to surface irregularities, the improvement comprising,
    a manifold having an open interior and defining multiple openings arranged in a generally rectangular pattern and in common communication with said open interior of said manifold,
    pump means in communication with said open interior of said manifold for developing relatively low vacuum, high flow rate conditions adjacent each of said openings, and
    vacuum cups mounted respectively in said openings, said vacuum cups each being of bellows-like construction and formed from flexible material to permit expansion and contraction along their axes, said vacuum cups each being formed with means for attachment in one of said manifold openings, said vacuum cups each having a flexible base portion providing an opening for sealing engagement with the round food articles, said vacuum cups also each including means forming a relatively large orifice for permitting relatively unrestricted communication between said flexible base portions and said open interior of said manifold whereby the high flow rate conditions in said manifold rapidly and simultaneously develop vacuum conditions in all of said vacuum cups upon engagement of said cups with the round food articles to cause food articles generally corresponding in number to said vacuum cups to simultaneously adhere to said vacuum cups,
    said flexible base portions forming frusto-spherical seal surfaces for engagement with the fruit units,
    said bellows-like portions of said vacuum cups being formed from resilient material having a shore hardness selected to facilitate axial expansion and contraction of said bellows-like construction while resisting radial collapse of said bellows-like vacuum cups, said flexible base portions of said vacuum cups which form said frusto-spherical seal surfaces being formed from resilient material having a relatively lower shore hardness in order to further facilitate sealing engagement of siad seal surfaces with the fruit units and to facilitate the shedding of wax build-up on said seal surfaces.

2. The improved apparatus of claim 1 wherein said pump means is adapted for developing a vacuum of about five inches of mercury in said manifold.

3. The improved apparatus of claim 1 wherein said pump means comprises a vacuum source capable of producing a vacuum of about five inches of mercury and a flow rate of about 60 to 100 cubic feet per minute.

4. The improved apparatus of claim 2 wherein the round food articles are units of fruit having an average size, and openings formed by said flexible base portions of said vacuum cups being sized to generally conform to the average size fruit units.

5. The improved apparatus of claim 1 further comprising flexible bands of increased cross-section at open ends of said vacuum cups adjacent said seal surfaces for facilitating formation of seals between said seal surfaces and the fruit units.

6. The improved apparatus of claim 1 wherein the shore hardness of said bellows-like portions is about 70 and the shore hardness of said flexible base portions is about 40.

7. The improved apparatus of claim 1 wherein said bellows-like portions of said vacuum cups are each formed with inwardly facing convolutions of generally uniform increasing diameter toward said flexible base portion, first convolutions spaced on said bellows-like portions from said seal surfaces having proportionally greater diameters to assure that they remain out of contact with the fruit units during contraction of the bellows-like portions.

8. The improved apparatus of claim 1 wherein annular portions of said vacuum cups adjacent said attachment means are relatively thicker than the remainder of said bellows-like portions, said annular portions being flexibly connected with said attachment means so that said annular portions taper downwardly from said attachment means when said bellows-like portions are extended to facilitate radial movement of said bellows-like portions for entering into engagement with the fruit units, said annular portions tending to move into engagement with said manifold when said bellows-like portions are contracted after engagement with fruit units in order to limit flexible movement of said bellows-like portions with the fruit units adhered thereto.

9. The improved apparatus of claim 8 wherein said attachment means comprises an enlarged flexible nipple for snap-fit sealing engagement in each of said manifold opening.

10. A vacuum cup for use in apparatus including one or more pickup heads for picking up and transferring layers of round food articles subject to surface irregularities, each pickup head including a manifold defining multiple openings and adapted for developing relatively low vacuum, high flow rate conditions adjacent said openings, said vacuum cup comprising, means for attachment in one of the manifold openings, a flexible base portion connected with said attachment means by a bellows-like cylindrical element formed from flexible material to permit expansion and contraction along its axis, said flexible base portion providing an opening for sealing engagement with one of the round food articles, and means forming a relatively large orifice for permitting relatively unrestricted communication between said flexible base portion and said manifold whereby a high flow rate condition developed in the manifold can rapidly equalize vacuum conditions in said vacuum cup upon engagement with the round food article for causing the food article to adhere thereto, said bellows-like portion of said vacuum cup being formed from a resilient material having a shore hardness selected to facilitate axial expansion and contraction of said bellows-like construction while resisting radial collapse of said bellows-like vacuum cup, said flexible base portion of said vacuum cup being formed from a resilient material having a relatively lower shore hardness in order to further facilitate sealing engagement with the fruit unit and to facilitate the shedding of wax build-up on said opening of said base portion.

11. The vacuum cup of claim 10 wherein the round food articles are units of fruit having an average size, said opening formed by said flexible base portion being sized to generally conform to the average size fruit unit.

12. The vacuum cup of claim 10 wherein said flexible base portion includes a frusto-spherical seal surface for engagement with the fruit unit.

13. The vacuum cup of claim 12 further comprising a flexible band of increased cross-section at an open end of said vacuum cup adjacent said seal surface for facilitating formation of a seal between said seal surface and the fruit unit.

14. The vacuum cup of claim 10 wherein the shore hardness of said bellows-like portion is about 70 and the shore hardness of said flexible base portion is about 40.

15. A vacuum cup for use in apparatus including one or more pickup heads for picking up and transferring layers of round food articles subject to surface irregularities, each pickup head including a manifold defining multiple openings and adapted for developing relatively low vacuum, high flow rate conditions adjacent said openings, said vacuum cup comprising, means for attachment in one of the manifold openings, a flexible base portion connected with said attachment means by a bellows-like cylindrical element formed from flexible material to permit expansion and contraction along its axis, said flexible base portion providing an opening for sealing engagement with one of the round food articles, and means forming a relatively large orifice for permitting relatively unrestricted communication between said flexible base portion and said manifold whereby a high flow rate condition developed in the manifold can rapidly equalize vacuum conditions in said vacuum cup upon engagement with the round food article for causing the food article to adhere thereto, said bellows-like portion of said vacuum cup being formed with inwardly facing convolutions of generally uniform increasing diameter toward said flexible base portion, a first convolution spaced on said bellows-like portion from said opening having a proportionally greater diameter to assure that it remains out of contact with the fruit unit during contraction of the bellows-like portion.

16. The vacuum cup of claim 15 wherein said flexible base portion forms a frusto-spherical seal surface for engagement with the food article.

17. The vacuum cup of claim 16 further comprising a flexible band of increased cross-section at an open end of said vacuum cup adjacent said seal surface for facilitating formation of a seal between said seal surface and the food article.

18. The vacuum cup of claim 16 wherein said bellows-like portion of said vacuum cup is formed from a resilient material having a shore hardness selected to facilitate axial extension and contraction of said bellows-like portion while resisting radial collapse of said bellows-like portion, said flexible base portion of said vacuum cup which forms said frusto-spherical seal surface being formed from a resilient material having a relatively lower shore hardness in order to further facilitate sealing engagement of said seal surface with the fruit unit and to facilitate the shedding of wax build-up from said seal surface.

19. The vacuum cup of claim 18 wherein the shore hardness of said bellows-like portion is about 70 and the shore hardness of said flexible base portion is about 40.

20. A vacuum cup for use in apparatus including one or more pickup heads for picking up and transferring layers of round food articles subject to surface irregularities, each pickup head including a manifold defining multiple openings and adapted for developing relatively low vacuum, high flow rate conditions adjacent said openings, said vacuum cup comprising, means for attachment in one of the manifold openings, a flexible base portion connected with said attachment means by a bellows-like cylindrical element formed from flexible material to permit expansion and contraction along its axis, said flexible base portion providing an opening for sealing engagement with one of the round food articles, and means forming a relatively large orifice for permitting relatively unrestricted communication between said flexible base portion and said manifold whereby a high flow rate condition developed in the manifold can rapidly equalize vacuum conditions in said vacuum cup upon engagement with the round food article for causing the food article to adhere thereto, an annular portion of said vacuum cup adjacent said attachment means being relatively thicker than the remainder of said bellows-like portion, said annular portion being flexibly connected with said attachment means so that the annular portion tapers downwardly from said attachment means when the bellows-like portion is extended to facilitate radial movement of said bellows-like portion for entering into engagement with the fruit unit, said annular portion tending to move into engagement with said manifold when said bellows-like portion is contracted after engagement with a fruit unit in order to limit flexible movement of said bellows-like portion with the fruit unit adhered thereto.

21. The vacuum cup of claim 20 wherein said attachment means comprises an enlarged flexible nipple for snap-fit sealing engagement in the manifold opening.

* * * * *

UNITED STATES PATENT AND TRADEMARK OFFICE
CERTIFICATE OF CORRECTION

PATENT NO. : 4,583,910
DATED : April 22, 1986
INVENTOR(S) : Bradley N. Borgman, Jerry W. Cramer & Don E. Dossey It is certified that error appears in the above-identified patent and that said Letters Patent are hereby corrected as shown below:

Column 6, line 3, "16" should read --18--.

Column 8, line 41, "weighed" should read --wedged--.

Column 13, line 42, "oranges" should read --objects--.

Signed and Sealed this

Eighth Day of July 1986

[SEAL]

Attest:

Attesting Officer

DONALD J. QUIGG

Commissioner of Patents and Trademarks